L. D. HUBBELL.
CHANGE SPEED MECHANISM.
APPLICATION FILED AUG. 1, 1906.
968,849.
Patented Aug. 30, 1910.
2 SHEETS—SHEET 2.
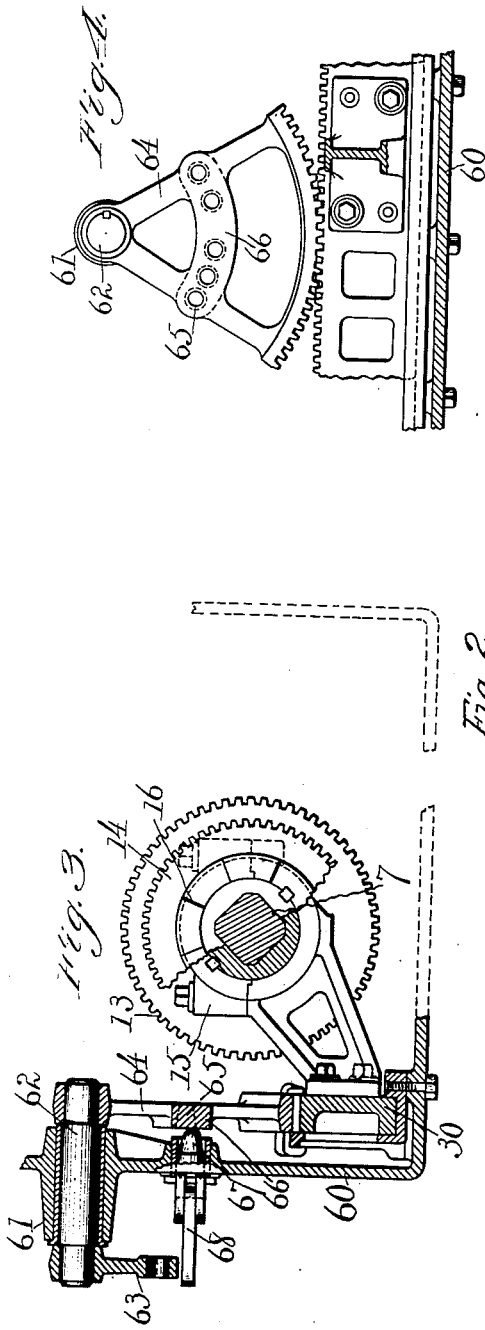
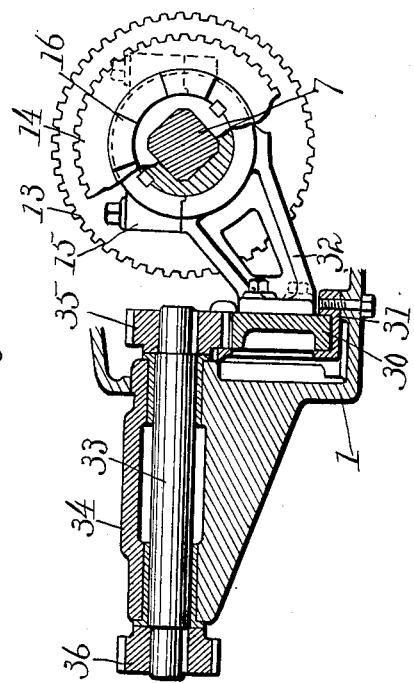
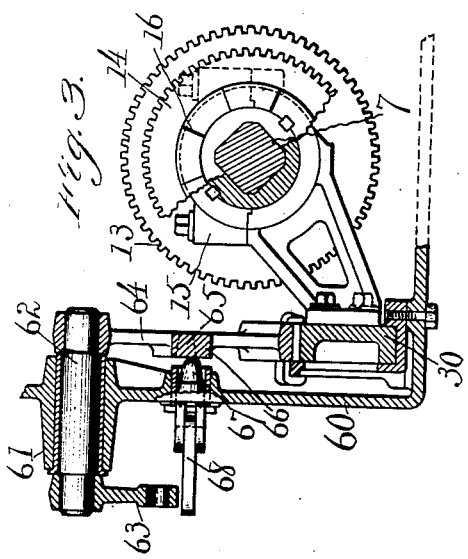

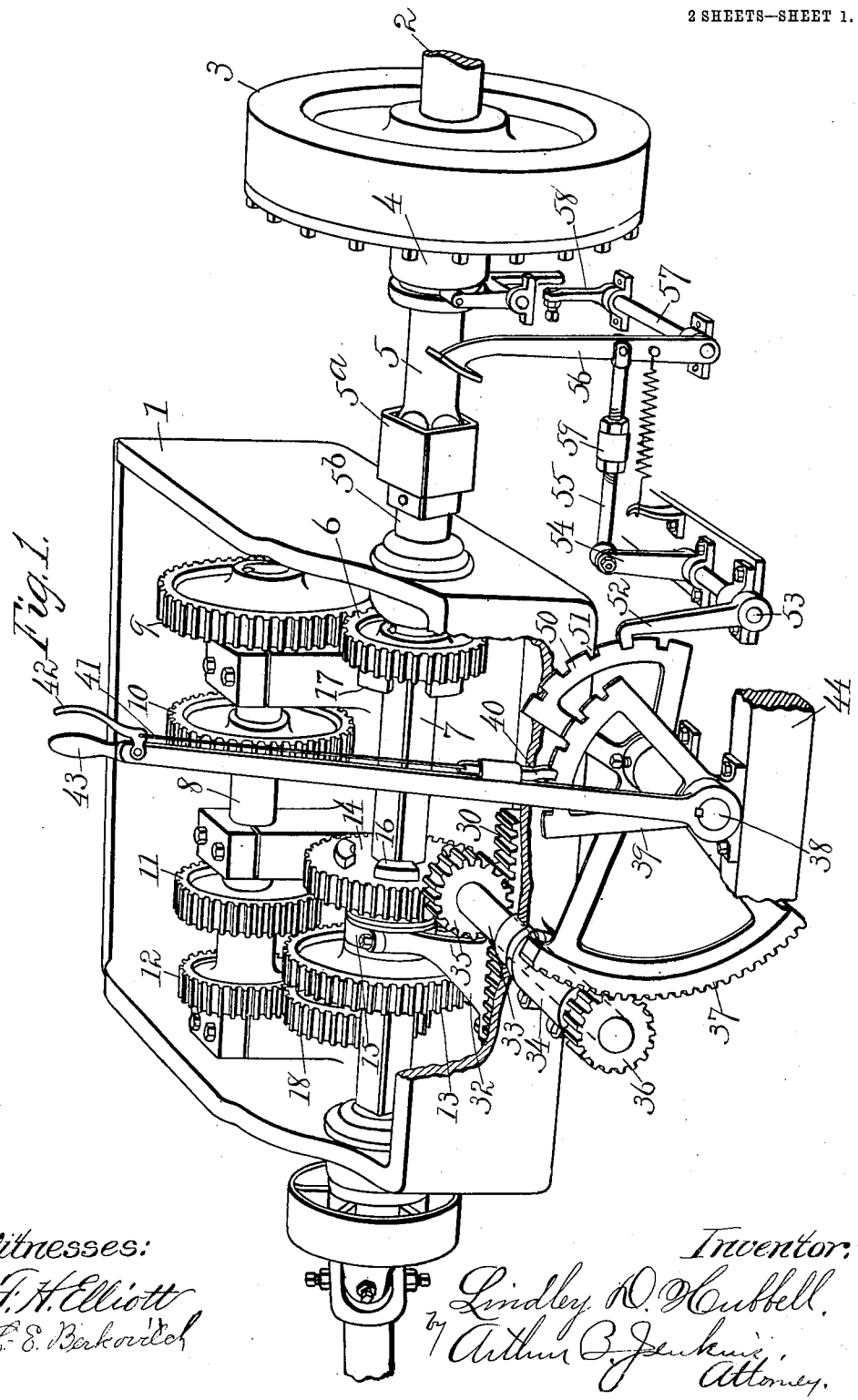

UNITED STATES PATENT OFFICE.

LINDLEY D. HUBBELL, OF HARTFORD, CONNECTICUT, ASSIGNOR TO THE POPE MANUFACTURING COMPANY, OF HARTFORD, CONNECTICUT, A CORPORATION OF CONNECTICUT.

CHANGE-SPEED MECHANISM.

968,849.  Specification of Letters Patent.  Patented Aug. 30, 1910.

Application filed August 1, 1906. Serial No. 328,703.

*To all whom it may concern:*

Be it known that I, LINDLEY D. HUBBELL, a citizen of the United States, and a resident of Hartford, in the county of Hartford and State of Connecticut, have invented a new and Improved Change-Speed Mechanism, of which the following is a specification.

My invention relates more especially to the class of devices used for causing a shaft to rotate at variable speeds, and the object of my invention is to provide an improved means for operating the movable gears commonly used in this class of devices; and a further object of the invention is to provide means whereby the driving power is removed from said gears before they are shifted to impart different rates of rotation to the shaft. A form of device in the use of which these objects may be attained is illustrated in the accompanying drawings, in which—

Figure 1 is a perspective view showing the transmission gearing of a motor vehicle with my invention applied thereto, parts being broken in section to show construction, the pinion shaft being elongated from the regular construction shown in Fig. 2, for purposes of clearness in illustration. Fig. 2 is a detail view in cross-section on the line of the pinion shaft, parts being broken away to show construction. Fig. 3 is a detail view in section across the transmission gear box showing another means of carrying out the invention, a portion of said transmission gear box being shown in dotted lines. Fig. 4 is a detail view illustrating the means of connection with the sliding rack in this form of the invention.

My invention while not limited to use in connection with any special form of mechanism, yet is readily applicable and finds special advantages in connection with the transmission mechanism of a motor vehicle, and for this reason such mechanism has been adopted by me for the purpose of illustrating my invention.

In the accompanying drawings the numeral 1 denotes the transmission gear casing of a motor vehicle that is mounted in any suitable manner on the frame of the vehicle and provided with a cover, (this manner of mounting and the cover not being shown).

The numeral 2 denotes the driving shaft which extends from the engine, 3 the fly wheel and clutch as a whole, 4 the sleeve for shifting the clutch parts, 5 a section of shaft connected by the clutch parts with the driving shaft, 5ª a flexible connection between this section and the section 5ᵇ to which is secured the main gear 6. The transmission shaft 7 is so connected with the section 5 as to rotate independently thereof, in a manner that is well understood in mechanism of this general class.

The numeral 8 denotes the lay or jack shaft, which is suitably mounted in the gear casing 1 and bears the several gears 9—10—11 and 12 securely keyed to it for transmitting variable speeds to the transmission shaft 7.

The numerals 13 and 14 denote sliding gears mounted for longitudinal reciprocation on the transmission shaft 7, these gears being so mounted that while they may have a longitudinal sliding movement on the shaft the latter is compelled to rotate with the gears. The two gears are rigidly connected and a band 15 is mounted between the gears that rotate therein, the latter being connected to means for reciprocating the gears along the shaft. The gear 14 has lugs 16 to mesh with lugs 17 on the gear 6.

When the gear 13 is in mesh with the reversing gear 18 that meshes with the gear 12 the transmission shaft 7 is rotated backward. In the position of the parts shown in Fig. 1 the transmission shaft 7 remains stationary although the driving shaft be rotating.

With the gear 13 meshing with the gear 11 the transmission shaft 7 is driven at slow speed, and with the gear 14 meshing with the gear 10 the transmission shaft 7 is rotated at the intermediate speed, and when the sliding gears 13 and 14 are in position so that the lugs 16 and 17 engage, then the transmission shaft 7 is locked to the section 5 to rotate therewith at the same speed, thus imparting a high speed to the rear wheels with which the transmission shaft is suitably connected.

All of the parts above enumerated are of old and well-known construction and a further description is therefore deemed unnecessary herein. Prior to my invention, however, the band 15 has been operated as by means of a yoke secured to a rock shaft, but there are certain disadvantages in this form of construction which it is the purpose of my present invention to obviate.

In carrying out my invention I provide a sliding rack 30 suitably mounted in a guide 31 secured to the case 1, as plainly shown in Fig. 2 of the drawings. An arm 32 secured to the rack in any desired manner extends laterally therefrom and is secured to the band 15. In the form shown a collar is provided, one part of which is integrally formed with the arm 32 and the other part of which is constituted by the band 15, as shown in Fig. 2 of the drawings.

A pinion shaft 33 is mounted in a bearing 34 formed on the casing 1, this shaft bearing pinions one of which, 35, meshes with the teeth or serrations of the rack 30 and the other of which, 36, meshes with a toothed segment 37 secured to an operating rock shaft 38. A locking segment 39 is secured as to a frame part 44 and within which the shaft 38 may have a bearing. This segment has notches to be engaged by a pawl 40, operated by a connecting rod 41 and a pawl operating lever 42 mounted on the change speed operating lever 43. The rock shaft locking segment and change speed operating lever are of usual and well-known construction.

Prior to my invention it has been necessary for the driver of the vehicle to continuously exercise care to disconnect the members forming parts of the clutch 3 before the lever 43 is operated to vary the speed of the machine. If such care is not exercised and the parts are operated to change the speed, especially to a higher stage there is great liability of stripping the gear teeth on the gears. By my present invention I have obviated the cause for such constant care and watchfulness on the part of the driver and have provided means whereby it is impossible to change or vary the speed of the vehicle without first throwing the clutch parts out of engagement. In carrying out this part of the invention I provide a segment 50 which is secured to the rock shaft 38, this segment having notches 51 for engagement of a detent 52 secured to a rock shaft 53 having an arm 54 connected by a rod 55 with the foot lever 56. This foot lever is connected in any usual manner as by a rock shaft 57 and arm 58 with the clutch mechanism, a further detailed description of which is deemed unnecessary.

The rod 55 may be provided with a connection 59, as shown, by means of which the length of the rod may be varied to properly adjust the parts.

From this construction it will be seen that the detent 52 locks the rock shaft 38 against movement until the lever 56 shall have been operated to throw the clutch parts from engagement. In this operation of the foot lever 56 the detent 52 is disengaged from the segment 50, so that the operating lever 43 may be freely operated to vary the speed of the vehicle.

It will be obvious that the details of construction may be departed from to a greater or less extent without avoiding the invention, and I do not intend to limit myself to the exact construction shown herein. For instance, in Figs. 3 and 4 I have shown one other efficient means for carrying the invention into effect. In this form of the device the transmission gear casing 60 has a rock shaft bearing 61 formed at or near the upper end in which the rock shaft 62 is mounted. This rock shaft has an arm 63 secured thereto, which arm may be suitably connected with the change speed operating lever. As suitable means of connecting this arm with said lever will occur to anyone skilled in the art further illustration and description is deemed unnecessary. To the opposite end of the rock shaft 62 a segment 64 is secured, the teeth of which mesh directly with the teeth or serrations of the rack 30. The rack is mounted in the same manner as hereinbefore described and illustrated with regard to Fig. 1, and the other parts of the mechanism extending from the rack to the transmission gearing is the same as illustrated and described in Figs. 1 and 2. In this form of the device, as a means of insuring disengagement of the clutch parts before the change speed operating lever can be moved, a number of openings 65 are provided in a bar 66 extending between the two side arms of the segment 64. A bolt 67 is mounted in the side of the casing 60, the inner end of this bolt being adapted to engage the openings 65 and the outer end being pivotally secured to a bell crank lever 68. This bell crank lever is suitably connected with the foot lever 56, which form of connection would readily suggest itself to those skilled in the art and for this reason further description and illustration are omitted. It will be noted that in this form of embodiment of the invention all of the toothed parts are inclosed within the transmission gear box and the connection with the rack 30 is practically direct, thus simplifying the construction of the parts as well as inclosing many parts heretofore left exposed.

In connecting the operating lever 43 with the rock shaft 62 shown in Fig. 3 it will be obvious that the lever may be directly secured to said shaft, or that the lever may be pivoted to another portion of the transmission gear box 60, or other fixed support, and a link extended from said lever to the arm 63. The lever may be pivoted at its end and said link connected between said ends, or the lever may be pivoted between its ends and the link connected to the lever at either side of the pivot.

What I claim as my invention and desire to secure by Letters Patent is:—

1. A driving shaft, a lay shaft, transmission gears thereon, a transmission shaft, a connection between said driving and lay shafts including a clutch, a connection including a movable member between the transmission shaft and said gears, a hand lever operatively connected to move said member, a toothed member rigidly connected with said hand lever, a detent to engage said toothed member to lock said lever against movement, means for operating the clutch, and connections between the clutch operating means and said detent to withdraw the latter after the clutch parts have been thrown out of engagement.

2. A driving shaft, a lay shaft, transmission gears thereon, a transmission shaft, a connection between said driving and lay shafts including a clutch, a gear mounted for longitudinal reciprocation on the transmission shaft, a hand lever operatively connected to slide said gear, a toothed member rigidly connected with said hand lever, a detent to engage said toothed member to lock said lever against movement, means for operating the clutch, and connections between the clutch operating means and said dent to withdraw the latter after the clutch parts have been thrown out of engagement.

3. A driving shaft, a lay shaft, transmission gears thereon, a connection between said shafts including a clutch, a transmission shaft to be driven by said gears, a gear mounted for longitudinal reciprocation on said shaft, a rock-shaft, a hand lever rigidly secured to said shaft, connections between the rock-shaft and sliding gear, a notched segment secured to said rock-shaft, a detent to engage said notches, means for operating said clutch, and connections between the clutch operating means and said detent to release the latter after the clutch parts have been disengaged.

4. A driving shaft, a lay shaft, transmission gears thereon, a connection between said, shafts including a clutch, a transmission shaft to be driven by said gears, a gear mounted for longitudinal reciprocation on said shaft, means for reciprocating said slidable gear and including a longitudinally movable rack and a rigidly connected yoke embracing the gear, a rock shaft, a toothed sector secured to the rock shaft and operatively connected with said rack, means for operating the rock shaft, a detent to engage openings in a part connected with said rock shaft, means for operating said clutch, and connections between the clutch operating means and said detent to release the latter after the clutch parts have been disengaged.

5. A lay shaft, transmission gears thereon, means including a clutch for rotating said shaft, a transmission shaft to be driven by said gears, a gear rotatably mounted for longitudinal reciprocation on said shaft, means non-rotatably connected with said gear to operate it, a toothed slide to which said means is secured, a shaft, a toothed member thereon in engagement with the teeth of said slide, a lever operatively connected with said shaft, a detent to lock said lever against movement, and connections between said clutch and detent for releasing the latter after the clutch parts have been disengaged.

6. A transmission gear box, a lay shaft inclosed therein transmission gears thereon a transmission shaft to be driven by said gears, a gear mounted for longitudinal reciprocation on said driven shaft, means including a clutch for rotating said shafts, a toothed slide mounted within said box, means connecting said slide and longitudinally reciprocating gear, a shaft projecting within the box, a toothed member secured to said shaft and in engagement with said slide, an actuating lever operatively connected with said shaft, a detent to hold said shaft against movement, and connections between said clutch and said detent to release the latter after the clutch parts have been disengaged.

7. A driving shaft, a lay shaft, transmission gears thereon, a transmission shaft, a connection between said driving and lay shafts including a clutch, a connection including a movable member between the transmission shaft and lay shaft, a hand lever operatively connected to move said connection, a segment rigidly connected with said hand lever, a shaft bearing a detent arranged to engage said segment, means for operating said clutch, and connections between the clutch operating means and the shaft bearing the detent to operate the detent to withdraw it after the clutch parts have been thrown out of engagement.

8. A driving shaft, a lay shaft, transmission gears thereon, a connection between said shafts including a clutch, a transmission shaft to be driven by said gears, a gear mounted for longitudinal reciprocation on said shaft, means for reciprocating said slidable gear and including a longitudinally movable rack and a rock-shaft, a toothed sector secured to the rock-shaft and operatively connected with said rack, means for operating the rock-shaft, a notched member, connected with said rock-shaft, a detent to engage said notched member, means for operating said clutch, and connections between the clutch operating means and said detent to release the latter.

9. A driving shaft, a lay shaft, transmission gears thereon, a connection between the said shafts including a clutch, a transmission shaft to be driven by said gears, a gear mounted for longitudinal reciprocation on said shaft, a rock-shaft, means for operating said rock-shaft, connections between the rock-shaft and sliding gear, a segment secured to said rock-shaft and having notches, a second rock-shaft, a detent rigidly secured to said second rock-shaft in position to engage said notches, means for operating said clutch, and an operative connection between said clutch operating means and said second rock-shaft.

LINDLEY D. HUBBELL.

Witnesses:
A. M. HOLCOMBE,
L. H. KELTING.